(12) United States Patent
Mashimo

(10) Patent No.: US 10,996,458 B2
(45) Date of Patent: May 4, 2021

(54) LIGHT SOURCE MODULE, OPTICAL DEVICE, AND METHOD FOR PRODUCING LIGHT SOURCE MODULE

(71) Applicant: Jun Mashimo, Kanagawa (JP)

(72) Inventor: Jun Mashimo, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/989,893

(22) Filed: Aug. 11, 2020

(65) Prior Publication Data

US 2020/0371342 A1 Nov. 26, 2020

Related U.S. Application Data

(63) Continuation of application No. 16/424,520, filed on May 29, 2019, now Pat. No. 10,775,606.

(30) Foreign Application Priority Data

Jun. 25, 2018 (JP) .............................. JP2018-120208

(51) Int. Cl.
| | | |
|---|---|---|
| *G03B 21/14* | (2006.01) | |
| *H04N 9/31* | (2006.01) | |
| *G02B 26/00* | (2006.01) | |
| *G03B 33/08* | (2006.01) | |
| *G02B 26/08* | (2006.01) | |
| *G03B 21/20* | (2006.01) | |
| *F21V 9/32* | (2018.01) | |

(52) U.S. Cl.
CPC .............. *G02B 26/008* (2013.01); *F21V 9/32* (2018.02); *G02B 26/0816* (2013.01); *G03B 21/204* (2013.01); *G03B 33/08* (2013.01); *H04N 9/3141* (2013.01)

(58) Field of Classification Search
CPC .... G03B 21/008; G03B 21/14; G03B 21/204; G03B 21/006; G03B 21/2073; H04N 9/31; H04N 9/3161; H04N 9/3158; F21V 9/14; F21V 9/32; F21Y 2115/30
See application file for complete search history.

(56) References Cited

U.S. PATENT DOCUMENTS

| | | | |
|---|---|---|---|
| 10,274,815 B2 | 4/2019 | Kang et al. | |
| 2014/0016098 A1 | 1/2014 | Matsumoto | |
| 2015/0253653 A1 | 9/2015 | Fujita et al. | |
| 2017/0064270 A1 | 3/2017 | Amsbeck | |

FOREIGN PATENT DOCUMENTS

JP 2011-180353 9/2011

*Primary Examiner* — William C. Dowling
(74) *Attorney, Agent, or Firm* — Xsensus LLP

(57) ABSTRACT

A light source module including a phosphor wheel having a phosphor layer to emit fluorescence when excited with light emitted from a light source; and a drive section disposed on a phosphor-layer side of the phosphor wheel, the drive section configured to rotate the phosphor wheel.

19 Claims, 9 Drawing Sheets

LIGHT SOURCE MODULE, OPTICAL DEVICE, AND METHOD FOR PRODUCING LIGHT SOURCE MODULE

CROSS-REFERENCE TO RELATED APPLICATIONS

This patent application is a continuation of U.S. application Ser. No. 16/424,520, filed May 29, 2019, which is based on and claims priority pursuant to 35 U.S.C. § 119(a) to Japanese Patent Application No. 2018-120208, filed on Jun. 25, 2018, in the Japan Patent Office, the entire disclosure of which is incorporated by reference herein.

BACKGROUND

Technical Field

Embodiments of this disclosure relate to a light source module, an optical device, and a method for producing a light source module.

Description of the Related Art

A technique of irradiating a phosphor layer laid on a rotatable phosphor wheel with excitation light to use emitted fluorescence in a light source module used in an image projection apparatus (so-called projector) or the like that projects an image on a screen or the like to magnify the display is known.

As such a light source module, a technique of providing the phosphor layer in a recess formed on a surface of the phosphor wheel so as to reduce diffused light, which becomes stray light, among the light emitted from the phosphor layer and make effective use of the light emitted from the phosphor layer.

SUMMARY

In one aspect of this disclosure, there is provided an improved light source module including a phosphor wheel having a phosphor layer to emit fluorescence when excited with light emitted from a light source; and a drive section disposed on a phosphor-layer side of the phosphor wheel, the drive section configured to rotate the phosphor wheel.

BRIEF DESCRIPTION OF THE DRAWINGS

The aforementioned and other aspects, features, and advantages of the present disclosure would be better understood by reference to the following detailed description when considered in connection with the accompanying drawings, wherein.

Figure 1:
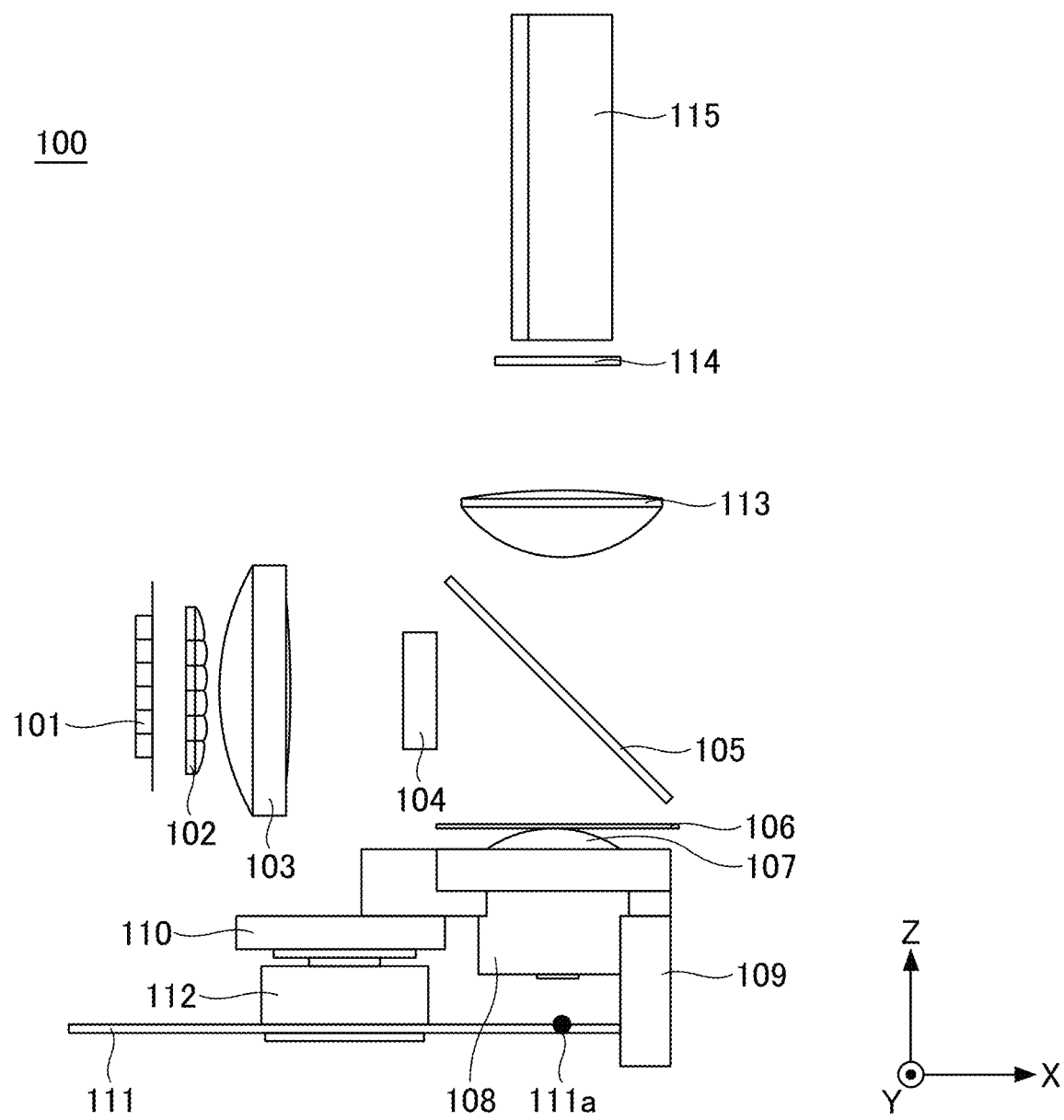
FIG. 1 is a view illustrating an example of a configuration of a lighting device according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION OF EMBODIMENTS

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

A description will hereinafter be made on embodiments of the present disclosure with reference to the drawings. In the drawings, the same components may be denoted by the same reference codes and the overlapping description may not be made.

In each of the embodiments, a lighting device provided with a light source module will be described as an example. Here, the lighting device is a device that irradiates an image generation unit such as a digital micromirror device (DMD) for generating a projection image with light in an image projection apparatus such as a projector. Such a lighting device is an example of the "optical device" described in the claims.

FIG. 1 is a view illustrating an example of a configuration of a lighting device according to a first embodiment of the present disclosure. As illustrated in FIG. 1, a lighting device 100 includes a light source 101, a fly eye lens 102, a lens 103, a lens 104, a wavelength selective polarization separation element 105, and a quarter wave plate 106. The lighting device 100 also includes a lens group 107, a lens barrel 108, a side plate 109, a holder 110, a phosphor wheel 111, a drive section 112, a lens 113, a color wheel 114, and a light tunnel 115.

In FIG. 1, a light source module includes the phosphor wheel 111, the drive section 112, the lens group 107, and a light shielding unit. The light shielding unit includes the side plate 109 and the drive section 112. A detailed description will separately be made on the light shielding unit with reference to FIG. 5 to FIG. 6.

Although not illustrated in FIG. 1, the light source module further includes a casing that accommodates (houses) the phosphor wheel 111, the drive section 112, the lens group 107, and the light shielding unit. Such a light source module is an example of the "light source module" described in the claims.

In the lighting device 100, the light source 101 emits light having a linear polarization component. In the present embodiment, as an example, the following description will be made on a case where the light source 101 is a laser diode array in which multiple laser diodes are arranged in parallel and each of the multiple laser diodes emits a blue laser beam with a wavelength $\lambda B$ having a P polarization component (which is P wave). The wavelength $\lambda B$ can satisfy 400 nm<$\lambda B$<470 nm, for example.

However, the light source 101 is not limited to the above. As the light source 101, one of the single laser diode that emits blue light, a light emitting diode, and an organic electro luminescence (EL) element may be used, or a light source in which at least some of these are combined may be used. Alternatively, the laser diode, the light emitting diode, the organic EL element, or the like that emits light having a wavelength range of an ultraviolet region may be used, or a light source in which at least some of these are combined may be used.

The blue laser beam emitted from the light source 101 is used as excitation light that generates fluorescence in the phosphor wheel 111.

The fly eye lens 102 is an optical element in which multiple lenses are arranged vertically and horizontally in a matrix in a form of fly eyes. With the fly eye lens 102, for example, an area irradiated with the light emitted from the light source 101 can have uniform illuminance distribution.

The blue laser beam emitted from the light source 101 is incident, as substantially parallel light beam, on the wavelength selective polarization separation element 105 via the fly eye lens 102, the lens 103, and the lens 104. The wavelength selective polarization separation element 105 is an optical path switching unit having a predetermined spectral transmittance characteristic.

The wavelength selective polarization separation element 105 has a characteristic of reflecting the P wave and not reflecting S wave (transmitting the S wave) at the wavelength $\lambda B$ of the light source 101. The light having a wavelength of approximately 500 nm or greater passes through the wavelength selective polarization separation element 105 regardless of whether the light is the P wave or the S wave (regardless of a polarization characteristic). As the wavelength selective polarization separation element 105, a polarization beam splitter can be used, for example.

The blue laser beam of the P wave, which is incident on the wavelength selective polarization separation element 105, is reflected by the wavelength selective polarization separation element 105 and is guided to the quarter wave plate 106 that is a polarization converter for mutually converting linearly polarized light and circularly polarized light. The light transmitted through the quarter wave plate 106 is changed from the P wave (P polarized light) to the circularly polarized light, and is incident on the phosphor wheel 111 via the lens group 107.

The polarization converter is not limited to the quarter wave plate. For example, a polarization converter in which an oblique vapor-deposited film of Ta 2O5 (tantalum pentoxide) or the like is formed on an incident surface of any lens forming the lens group 107, or the like may be used. Here, the oblique vapor-deposited film is a film in which a vapor deposition target is placed obliquely with respect to a fly direction of a vapor deposition material (a direction toward a vapor deposition source) and in which the vapor deposition material is obliquely deposited with respect to a normal to a predetermined surface of the vapor deposition target.

The lens group 107 can be configured by appropriately combining a biconvex lens, a plano-convex lens, and the like, for example. The lens group 107 has: a function of focusing the substantially parallel light beam in a spot shape on the phosphor wheel 111; and a function of using the focused light as the excitation light to parallelize divergent light emitted from the phosphor layer of the phosphor wheel 111 and convert the divergent light into the substantially parallel light beam. By expanding a numerical aperture (NA) of the lens group 107, it is possible to condense more of the divergent light, which is emitted from the phosphor layer and spreads hemispherically, and to improve condensing efficiency. The lens group 107 is an example of the "optical system" described in the claims.

The lens group 107 is accommodated in the lens barrel 108 and is pressed by an annular plate spring member. The annular plate spring member is fixedly attached to the lens barrel 108 by a screw or the like. In this way, the lens group 107 is fixedly mounted onto the lens barrel 108. By means of the annular plate spring member, the lens group 107 can be fixedly mounted onto the lens barrel 108 without being scratched. The lens barrel 108 is an example of the "lens barrel" described in the claims.

Figure 2:
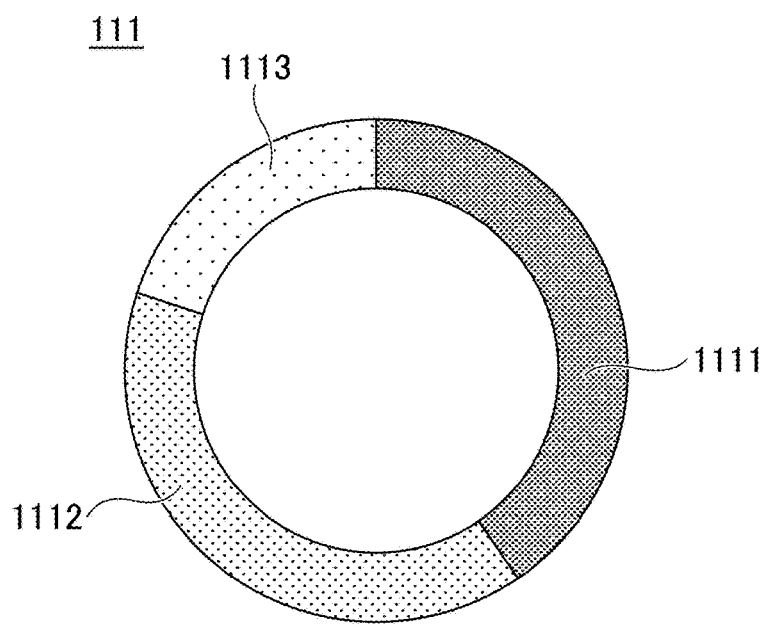
FIG. 2 is an enlarged plan view illustrating an example of a phosphor wheel according to the embodiment of the present disclosure.

Here, FIG. 2 is an enlarged plan view illustrating an example of the phosphor wheel used in the embodiment, and is a view of the phosphor wheel as viewed from an incident light side. As illustrated in FIG. 2, the phosphor wheel 111 is configured that a disk-like member, that is, a rotating body is divided into multiple fan-like regions (segments), each of which emits the different fluorescence. The phosphor wheel 111 is rotationally driven in a circumferential direction such that the region irradiated with the light from the wavelength selective polarization separation element 105 changes sequentially.

More specifically, in the circumferential direction, the phosphor wheel 111 is divided into the three fan-like regions (segments) including: a yellow (Y) phosphor region 1111 formed with a yellow (Y) phosphor emitting yellow fluorescence; a green (G) phosphor region 1112 formed with a green (G) phosphor emitting green fluorescence; and a reflecting surface region 1113 formed with a reflecting surface for reflecting the incident light.

The yellow (Y) phosphor region 1111 uses the blue laser beam as the excitation light to generate the yellow fluorescence having a longer wavelength than the blue laser beam. The green (G) phosphor region 1112 uses the blue laser beam as the excitation light to generate the green fluorescence having a longer wavelength than the blue laser beam. The reflecting surface region 1113 reflects the incident blue laser beam as the blue light as is.

The phosphor wheel 111 rotates to switch the segment arranged at an incident position of the light from the lens group 107, so as to be able to extract reflected light of each of the yellow fluorescence, the green fluorescence, and the blue laser beam. The above description is made on the example in which the reflecting surface region 1113 is used for a region where the blue light is extracted. However, the region where the blue light is extracted is not limited to the reflecting surface region 1113. For example, the blue light may be extracted by using at least one of a transparent region, a region with a hole, a diffusion region, and the like.

The transparent region is transparent glass, for example, and transmits the blue laser beam. The blue laser beam passes through the region with the hole as is. In an incident direction of light from the lens group 107, a reflecting surface is provided at a point ahead of the transparent region where the blue laser beam that has been transmitted or has passed, and the light transmitted through the transparent region or the light passing through the region with the hole reflected by reflecting surface. In this way, the blue light can be extracted. In the diffusion region, the blue laser beam is diffusely reflected. For example, the diffusion region can have a structure in which a large number of uneven structures in different sizes are formed on a surface.

In addition, the example in which the yellow phosphor region and the green phosphor region are used as the phosphor regions is described. However, one of the yellow phosphor region and the green phosphor region may be used. Alternatively, a phosphor region in a different color may replace the existing phosphor region and/or may be provided additionally.

Furthermore, in addition to the blue laser, a light source such as a red laser diode may additionally be provided as the light source.

Referring back to FIG. 1, the drive section 112 such as a stepping motor for rotating the phosphor wheel 111 is coupled to an axis of the phosphor wheel 111. The holder 110 holds the drive section 112 and the phosphor wheel 111 coupled to the drive section 112.

The phosphor wheel 111 rotates at predetermined timing as a result of driving of the drive section 112. In this way, the incident position of the light from the lens group 107 is switched to any of the three segments of the yellow (Y) phosphor region 1111, the green (G) phosphor region 1112, and the reflecting surface region 1113. A portion 111a of the phosphor layer illustrated in FIG. 1 is irradiated with the light from the lens group 107 and generates the fluorescence. The fluorescence emitted from the phosphor layer is light emitted from a uniform diffusion surface, luminance of which is not changed in any direction, and is so-called Lambertian light distribution light.

Each of the yellow fluorescence and the green fluorescence respectively emitted from the yellow (Y) phosphor region 1111 and the green (G) phosphor region 1112 passes through the lens group 107 and the quarter wave plate 106 in a reverse direction from the incident light, and is incident on the wavelength selective polarization separation element 105. Each of the yellow fluorescence and the green fluorescence at the time is in a state of random polarization.

As described above, the wavelength selective polarization separation element 105 transmits the light having the wavelength of approximately 500 nm or greater regardless of the polarization characteristic. Thus, the yellow fluorescence and the green fluorescence, which are generated by the phosphor wheel 111, pass through the wavelength selective polarization separation element 105 and is incident on the color wheel 114 through the lens 113.

Meanwhile, the light reflected by the reflecting surface region 1113 of the phosphor wheel 111 passes through the lens group 107 and the quarter wave plate 106 in the reverse direction of the incident light. Here, the circularly polarized light, which is incident on the reflecting surface region 1113, is maintained as the circularly polarized light after the reflection, but becomes the circularly polarized light that rotates in an opposite direction from the incident light due to the reflection. For example, the circularly polarized light that rotates clockwise at the time of the incidence becomes the circularly polarized light that rotates counterclockwise after the reflection. Then, after passing through the quarter wave plate 106, the circularly polarized light becomes the linearly polarized light, a polarization direction of which is orthogonal to a polarization direction of the incident light. Consequently, the linearly polarized light passes through the wavelength selective polarization separation element 105 and is incident on the color wheel 114 through the lens 113.

Figure 3:
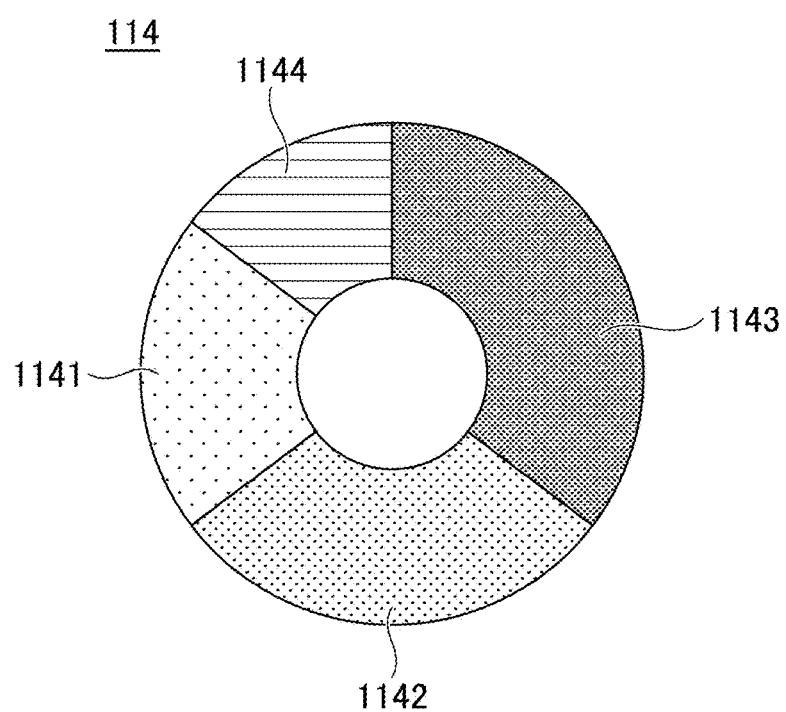
FIG. 3 is an enlarged plan view illustrating an example of a color wheel according to the embodiment of the present disclosure.

FIG. 3 is an enlarged plan view illustrating an example of the color wheel used in the embodiment, and is a view of the color wheel as viewed from the incident light side. As illustrated in FIG. 3, the color wheel 114 is configured that a disk-like member, that is, a rotating body is divided into multiple fan-like regions (segments). More specifically, in the circumferential direction, the color wheel 114 is divided into the four fan-like regions (segments) including a red (R) region 1141, a green (G) region 1142, a transparent region 1143, and a diffusion region 1144.

In the color wheel 114, the red (R) region 1141 is a region where a dichroic filter for transmitting red light is formed, transmits the light in a wavelength range of approximately 600 nm or greater, and reflects the light in the other wavelength ranges. The green (G) region 1142 is a region where a dichroic filter for transmitting green light is formed, transmits the light in a wavelength range from approximately 500 nm to approximately 580 nm, and reflects the light in the other wavelength ranges.

The transparent region 1143 transmits the light in all the wavelength ranges as is. The transparent region 1143 may be the transparent glass or the like, or may be configured to have a hole. The diffusion region 1144 diffuses and transmits the light in all the wavelength ranges. For example, the diffusion region 1144 can have the structure in which the large number of the uneven structures in the different sizes are formed on a surface.

The color wheel 114 rotates to switch the segment arranged at an incident position of the light from the lens 113, so as to be able to extract the red light, the green light, the yellow light, and the blue light.

Here, as a region that extracts the light without changing the wavelength, a reflecting surface region may be used. In addition, the example of the regions where the dichroic filters transmitting the red light and the green light are formed is described. However, the region is not limited thereto. In the region, any one of the dichroic filters may be formed. Alternatively, a dichroic filter in a different color may replace the existing dichroic filter and/or may be formed additionally. Furthermore, in addition to the blue laser, the light source such as the red laser diode may additionally be provided as the light source.

Referring back to FIG. 1, although not illustrated, a drive section such as a stepping motor for rotating the color wheel 114 is provided on an axis of the color wheel 114. The color wheel 114 rotates at predetermined timing as a result of driving of the drive section. In this way, the incident position of the light from the lens 113 is switched to any of the four segments of the red (R) region 1141, the green (G) region 1142, the transparent region 1143, and the diffusion region 1144. That is, on optical paths of the blue laser beam and the fluorescence, any of the segments is alternately arranged in time.

The blue light is incident on the color wheel 114 at the timing when the diffusion region 1144 is arranged at the incident position of the light from the lens 113. The blue light is diffused when passing through the diffusion region 1144. As a result, coherence of the blue light, that is, the laser beam is lost, and unevenness and a speckle that appears on a screen or the like are reduced. The light that has passed through the diffusion region 1144 becomes blue irradiation light.

The yellow fluorescence is incident on the color wheel 114 at the timing when one of the transparent region 1143 and the red (R) region 1141 is arranged at the incident position of the light from the lens 113. At the timing when the transparent region 1143 is arranged, yellow light with maximum brightness is obtained. The light that has passed through the transparent region 1143 becomes yellow irradiation light. At the timing when the red (R) region 1141 is arranged, red light is obtained. The light that has passed through the red (R) region 1141 becomes red irradiation light.

The green fluorescence is incident on the color wheel 114 at the timing when the green (G) region 1142 is arranged at the incident position of the light from the lens 113. In this way, purity of green is adjusted, and the light that has passed through the green (G) region 1142 becomes green irradiation light.

The light that has passed through each of the regions in the color wheel 114 is incident on the light tunnel 115.

The light tunnel 115 is a cylindrical hollow member. Each of the irradiation light incident on the light tunnel 115 is repeatedly reflected inside the light tunnel 115. Consequently, illuminance distribution of each of the irradiation light becomes uniform at an exit of the light tunnel 115. That is, the light tunnel 115 has a function as an illuminance uniformizing unit that reduces unevenness of light intensity of each of the irradiation light. Note that, instead of the light tunnel 115, another illuminance uniformizing unit such as the fly eye lens may be adopted.

The image generation unit such as the DMD is irradiated with the light, the illuminance distribution of which is uniformized through the light tunnel 115.

The lighting device 100 can irradiate the image generation unit with the light as described above. The image generation unit can generate the projection image using the irradiated light.

Here, a description will be made on the arrangement of the drive section in the light source module according to the present disclosure with reference to FIG. 4A and FIG. 4B.

Figure 4A:
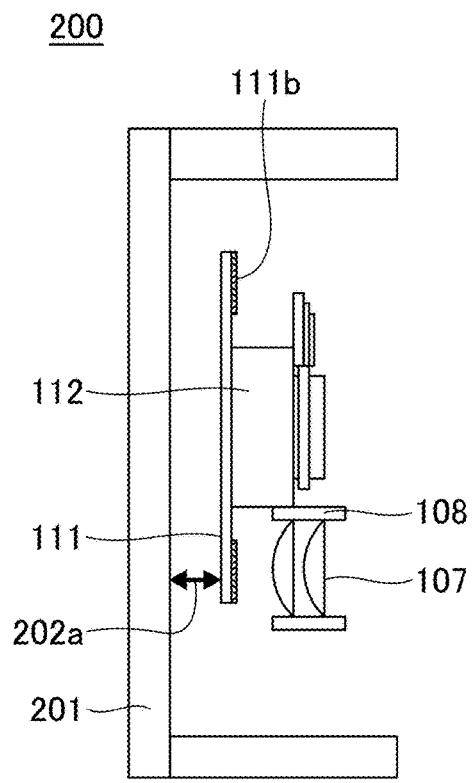
FIG. 4A and FIG. 4B are views, each of which illustrates an example of arrangement of a drive section according to the embodiment of the present disclosure.

FIG. 4A is a view illustrating an example of arrangement of the drive section 112 in a light source module 200 according to the embodiment of the present disclosure. In FIG. 4A, the drive section 112 is arranged on a surface side where a phosphor layer 111b (hatched portion) of the phosphor wheel 111 is provided. When the light source module 200, in which the drive section 112 is arranged just as described, is accommodated in a casing 201, a distance from a surface of the casing 201 opposing the phosphor wheel 111 to the phosphor wheel 111 becomes a length indicated by an arrow 202a in FIG. 4A.

Figure 4B:
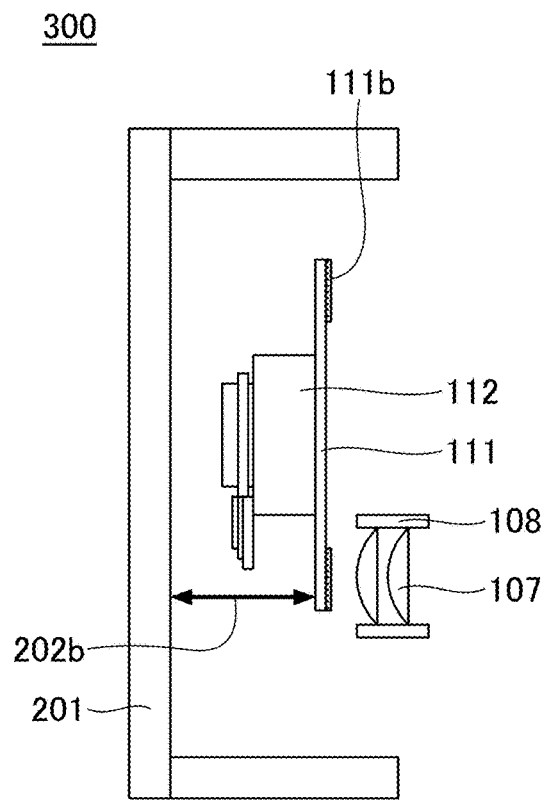

FIG. 4B is a view illustrating an example of the arrangement of the drive section 112 in a light source module 300 as a comparative example of the embodiment of the present disclosure. In FIG. 4B, components having the same functions as those of the light source module 200 of the embodiment are denoted by the same reference codes.

In FIG. 4B, the drive section 112 is arranged on a surface of the phosphor wheel 111 on an opposite side to the surface provided with the phosphor layer 111b (hatched portion). When the light source module 300, in which the drive section 112 is arranged just as described, is accommodated in the casing 201, the distance from the surface of the casing 201 opposing the phosphor wheel 111 to the phosphor wheel 111 becomes a length indicated by an arrow 202b in FIG. 4B. As apparent from the drawing, the length of the arrow 202a is less than the length of the arrow 202b.

In the present embodiment, the drive section 112 is arranged on the surface side of the phosphor wheel 111 where the phosphor layer 111b is provided. In this way, the distance from the surface of the casing 201 opposing the phosphor wheel 111 to the phosphor wheel 111 is reduced. Thus, a length of the light source module in a Z-direction can be reduced, and the light source module can be downsized.

Next, a description will be made on the light shielding unit in the light source module according to the embodiment of the present disclosure with reference to FIG. 5A and FIG. 5B.

Figure 5A:
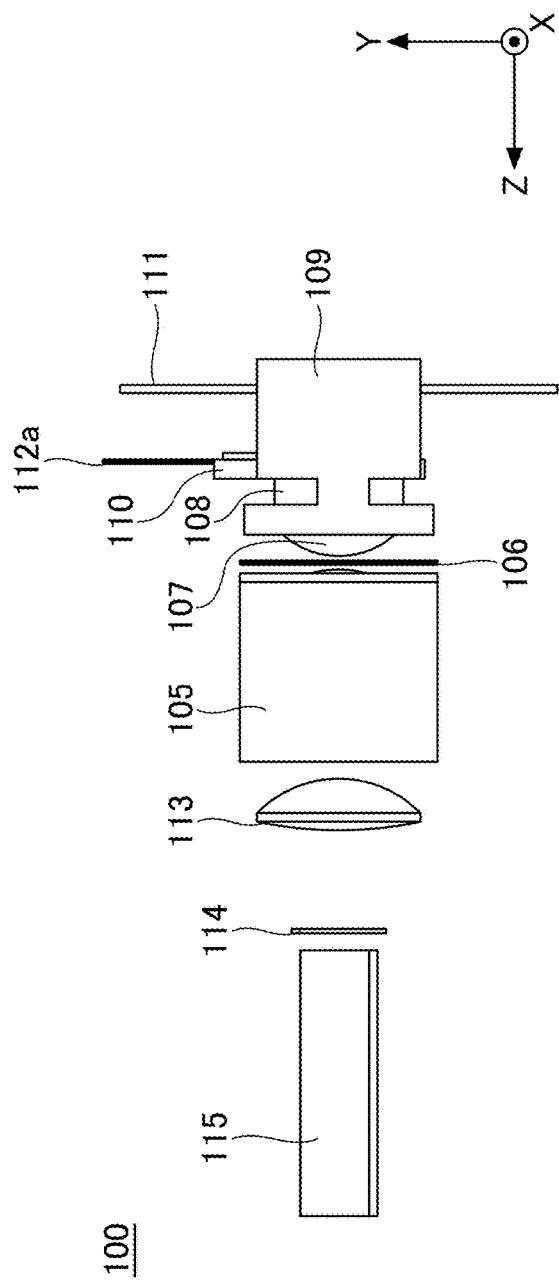
FIG. 5A and FIG. 5B are views, each of which illustrates an example of a configuration of a light shielding unit according to the embodiment of the present disclosure.
Figure 5B:
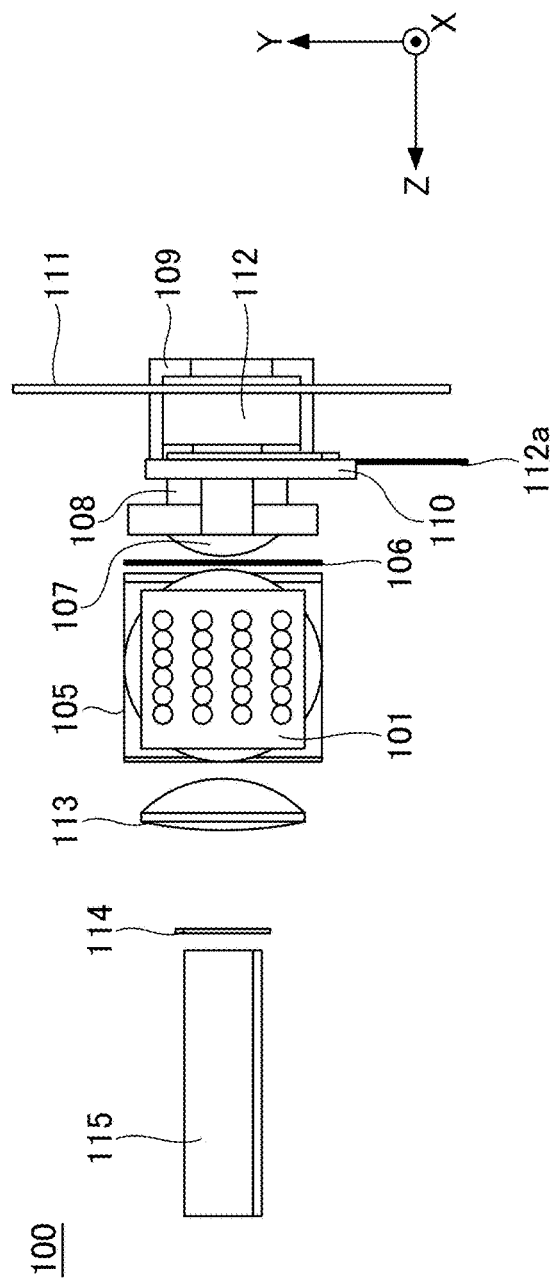

FIG. 5A and FIG. 5B are side views of the lighting device 100 illustrated in FIG. 1. FIG. 5A is a side view of the lighting device 100 illustrated in FIG. 1 as viewed from a positive X-direction, and FIG. 5B is a side view of the lighting device 100 illustrated in FIG. 1 as viewed from a negative X-direction.

As illustrated in FIG. 5A and FIG. 5B, the lens group 107 is accommodated in and fixed mounted onto the lens barrel 108. The side plate 109 is arranged on the phosphor layer of the phosphor wheel 111 in a manner to close a portion of the phosphor layer, which is irradiated with the light from the lens group 107 and emits the fluorescence, in the positive X-direction. Electrical wiring 112a is coupled to the drive section 112.

Here, the fluorescence emitted from the phosphor layer of the phosphor wheel 111 is the divergent light that spreads hemispherically around the light emitting point in the reverse direction from the incident direction of the excitation light. Of such divergent light, the light that propagates in a direction beyond the NA of the lens group 107 is not fully collected by the lens group 107. Thus, there is a case where the emitted fluorescence partly deviates from the effective aperture of the lens group 107, becomes the stray light, and cause noise such as flare in the projection image.

Figure 6:
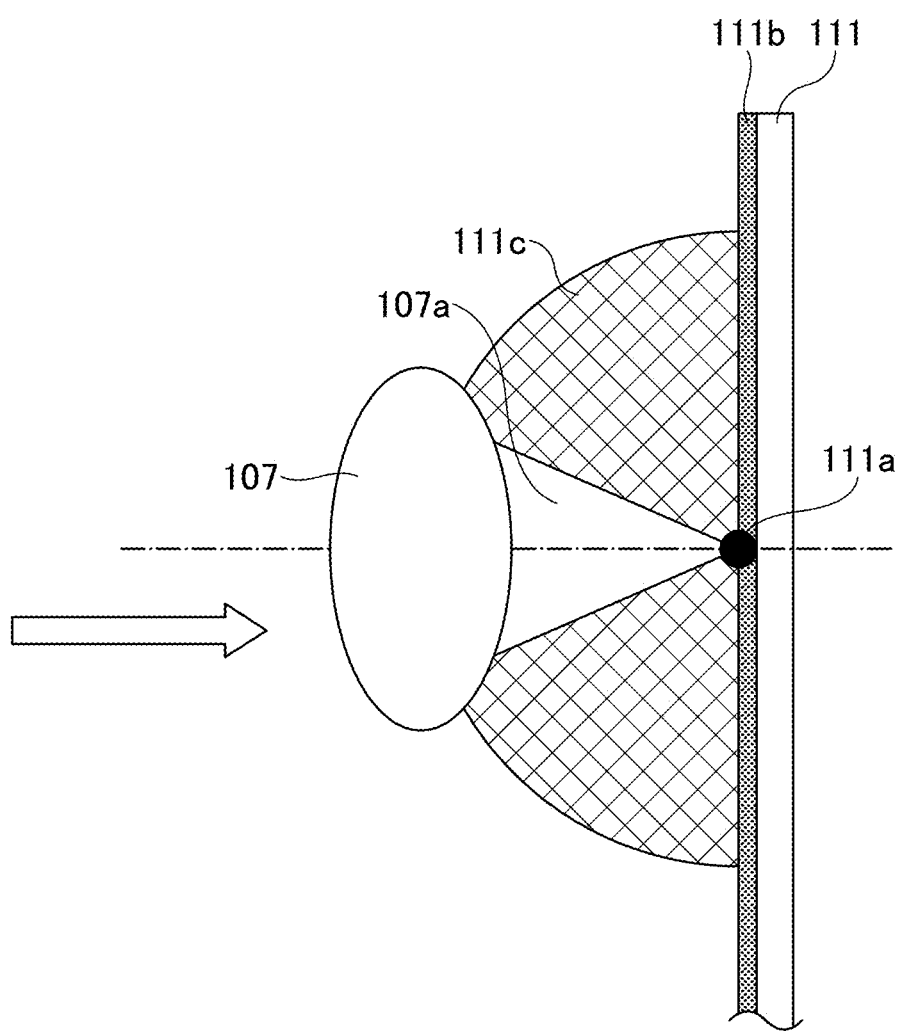
FIG. 6 is a view schematically illustrating a situation where fluorescence spreads hemispherically around a light emitting point according to the embodiment of the present disclosure.

FIG. 6 is a view schematically illustrating a situation where the fluorescence spreads hemispherically around the light emitting point. In FIG. 6, the phosphor layer 111b of the phosphor wheel 111 is irradiated with the excitation light from the lens group 107 in an arrow direction in the drawing. From a portion 111a of the phosphor layer 111b on which the excitation light is incident, the fluorescence is emitted, and divergent light 111c spreads hemispherically and propagates. Of the divergent light 111c, light 107a included in the NA of the lens group 107 is collected by the lens group 107 and used as the irradiation light. Meanwhile, the light that propagates in the direction beyond the NA of the lens group 107 (hatched light of the divergent light 111c) deviates from the effective aperture of the lens group 107 and becomes the stray light as described above.

Referring back to FIG. 5A and FIG. 5B, in the present embodiment, the side plate 109 is arranged in the manner to close the portion, which emits the fluorescence, in the positive X-direction. Accordingly, of the emitted fluorescence, the light that propagates in the positive X-direction and becomes the stray light is shielded, so as to prevent generation of the noise such as the flare in the projection image.

A surface of the side plate 109 is subjected to antireflection treatment to prevent the fluorescence incident on the surface from being reflected and becoming the stray light. For example, the antireflection treatment is treatment of dying the surface of the side plate 109 matte black or roughening the surface to scatter the incident light on the surface. Of the surface included in the side plate 109, at least the region irradiated with the fluorescence may be subjected to the antireflection treatment of the side plate 109.

Meanwhile, the drive section 112 is arranged on the phosphor layer of the phosphor wheel 111 in a manner to close the portion of the phosphor layer, which is irradiated with the light from the lens group 107 and emits the fluorescence, in the negative X-direction. In this way, of the emitted fluorescence, the light that propagates in the negative X-direction and becomes the stray light is shielded, so as to prevent the generation of the noise such as the flare in the projection image.

A surface of the drive section 112 is subjected to the antireflection treatment to prevent the fluorescence incident on the surface from being reflected and becoming the stray light. For example, the antireflection treatment of the drive section 112 is treatment of dying the surface of the drive section 112 the matte black or roughening the surface to scatter the incident light on the surface. Of the surface included in the drive section 112, at least a portion irradiated with the fluorescence may be subjected to the antireflection treatment.

As described above, in the present embodiment, each of the side plate 109 and the drive section 112 has the function of the light shielding unit and prevents the stray light generated by the fluorescence.

Note that the configuration including the side plate 109 and the drive section 112 is an example of the "light shielding unit that is provided around a portion emitting the fluorescence and at least partially shields the emitted fluorescence" described in the claims.

Figure 7B:
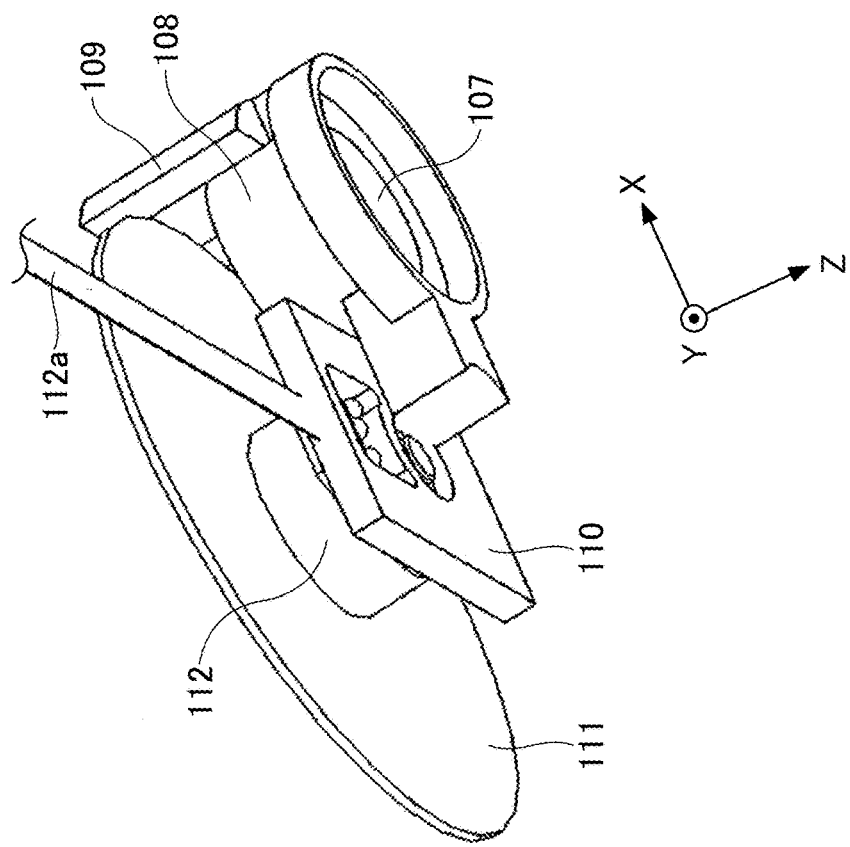
FIG. 7A and FIG. 7B are views, each of which illustrates an example of a configuration in which a lens barrel, a side plate, and a holder according to the embodiment of the present disclosure are integrated.
Figure 7A:
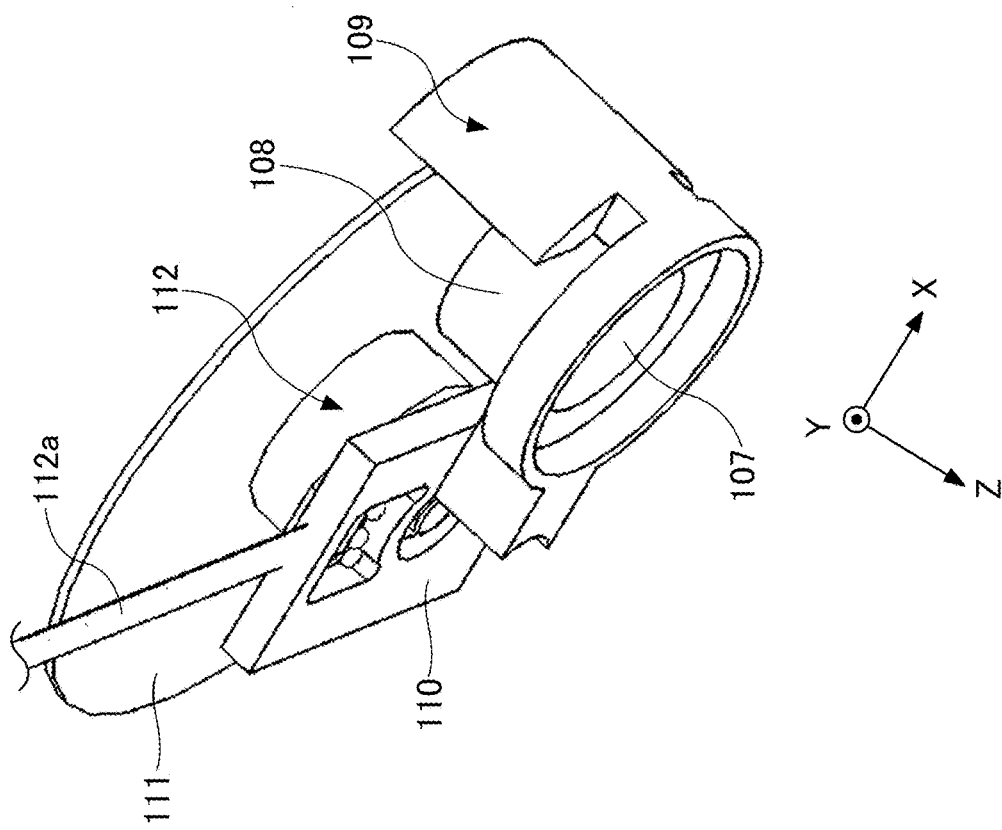

Next, a description will be made on a configuration in which the lens barrel, the side plate, and the holder in the embodiment of the present disclosure are integrated with reference to FIG. 7A and FIG. 7B. FIG. 7A is a perspective view of the phosphor wheel 111 illustrated in FIG. 1 as viewed in a positive Z-direction and from the positive X-direction. FIG. 7B is a perspective view of the phosphor wheel 111 illustrated in FIG. 1 similarly as viewed in the positive Z-direction and from the positive X-direction.

As described above, the side plate 109 is arranged in the manner to close the portion, which emits the fluorescence, in the positive X-direction. As an example, the side plate 109 has a shape of a partial cylinder as illustrated. Due to the arrangement of the side plate 109, of the emitted fluorescence, the light that propagates in the positive X-direction and becomes the stray light is shielded. In addition, the drive section 112 is arranged in the manner to close the portion, which emits the fluorescence, in the negative X-direction. Accordingly, of the emitted fluorescence, the light that propagates in the negative X-direction and becomes the stray light is shielded.

As illustrated in FIG. 7A and FIG. 7B, the lens barrel 108, the side plate 109, and the holder 110 of the drive section 112 are combined a single unit. Such a member is formed by cutting a metal material such as aluminum or iron, for example. Alternatively, such a member may be formed by using a die to mold plastic. In the case of plastic molding, cost reduction and processing time reduction can be achieved in mass production. However, in the case where the phosphor wheel 111 generates excessively high heat due to the irradiation of the excitation light, the members may melt. Thus, heat-resistant plastic is desirably used. In the case where the member in which the lens barrel 108, the side plate 109, and the holder 110 are integrated is formed of the metal material, there is no concern that the phosphor wheel 111 melts by generation of the heat and thus becomes the heat resistant member.

As described above, as the NA of the lens group 107 is expanded, the condensing efficiency of the fluorescence by the lens group 107 is improved. However, in the case where a distance between the lens group 107 and the phosphor wheel 111 fluctuates due to an installation error of the lens group 107, the condensing efficiency may be reduced significantly. The reduced condensing efficiency causes reduced brightness of the projection image in the image projection apparatus or the like. On the other hand, in the case where it is attempted to suppress the reduced condensing efficiency by such a distance fluctuation, high-precision assembly adjustment is required. As a result, an assembly time and assembly cost will be increased.

According to the present embodiment, the lens barrel 108, the side plate 109, and the holder 110 are combined as a single unit. Thus, the distance between the lens group 107 and the phosphor wheel 111 can be controlled in accordance with processing accuracy of the members. As a result, it is possible to suppress the reduced fluorescence condensing efficiency, which is associated with the fluctuation in the distance between the lens group 107 and the phosphor wheel 111, without increasing the assembly time and the assembly cost. In addition, since the fluctuation in the distance between the lens group 107 and the phosphor wheel 111 can be suppressed, the lens group 107 having the large NA, which can be brought closer to the phosphor wheel 111, can be designed and adopted. Therefore, and the fluorescence condensing efficiency is improved, and the bright lighting device can be realized.

Figure 8:
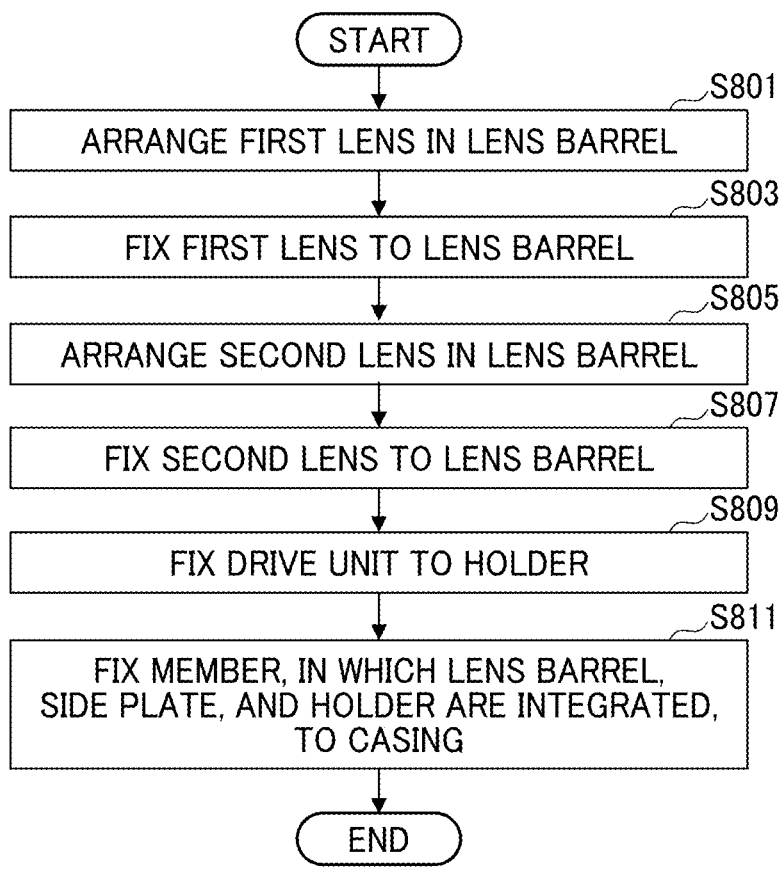
FIG. 8 is a flow diagram illustrating an example of a method for producing a light source module according to the embodiment of the present disclosure.
Figure 9:
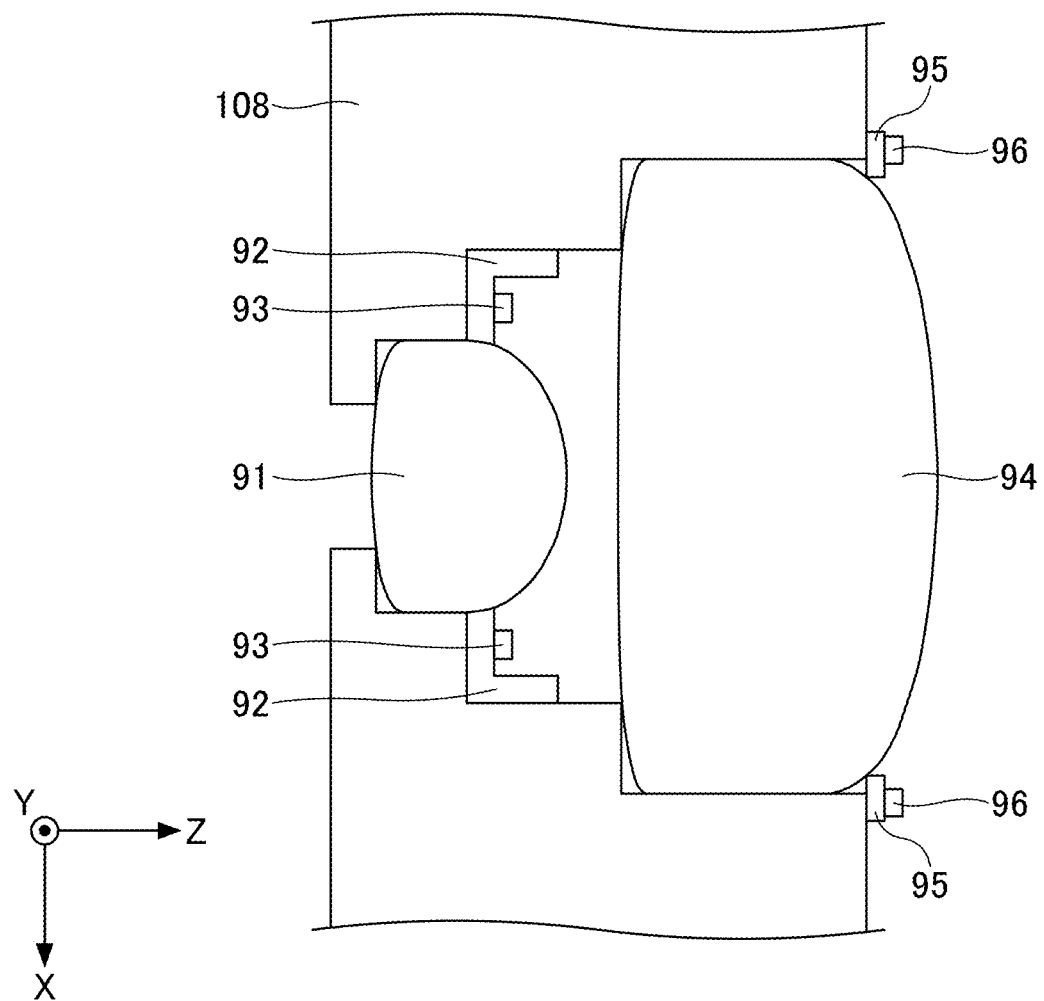
FIG. 9 is a view illustrating an example of a lens group and the lens barrel according to the embodiment of the present disclosure.

FIG. 8 is a flow diagram illustrating an example of a method for producing the light source module according to the embodiment of the present disclosure. In the method for producing illustrated in FIG. 8, as illustrated in FIG. 9, it is assumed that a lens group having a two-lens configuration including a first lens 91 and a second lens 94 is accommodated in and mounted onto the lens barrel 108. In addition, the lens barrel 108, the side plate 109, and the holder 110 are the single integrated member. In FIG. 9, the lens barrel 108 as a portion of such a member is illustrated while the rest of the member is not illustrated.

In FIG. 8, first, the first lens 91 is arranged at a predetermined position in the lens barrel 108 (step S801).

Next, the first lens 91 is held in a negative Z-direction by a plate spring member 92, and the plate spring member 92 is attached to the lens barrel 108 by a screw 93, so as to mount the first lens 91 onto the lens barrel 108 (step S803).

Next, the second lens 94 is arranged at a predetermined position in the lens barrel 108 (step S805).

Next, the second lens 94 is held in the negative Z-direction by a plate spring member 95, and the plate spring member 95 is fixedly attached to the lens barrel 108 by a screw 96, so as to mount the second lens 94 onto the lens barrel 108 (step S807).

Next, the drive section 112 is fixedly attached to the holder 110 (step S809).

Next, the member, in which the lens barrel 108, the side plate 109, and the holder 110 are integrated, is fixedly attached to the casing 201 (step S811). Such attachment may be performed with an adhesive or performed by fitting or screwing.

In this way, the light source module 200 of the present embodiment can be manufactured.

As it is described so far, according to the present embodiment, the drive section that rotates the phosphor wheel is provided on the surface side of the phosphor wheel where the phosphor layer is provided, and the drive section forms at least the part of the light shielding unit. Thus, the length of the light source module in the incident direction of the excitation light can be reduced, and the light source module can be downsized. In addition, of the fluorescence emitted from the phosphor layer, the light that becomes the stray light can be shielded due to provision of the light shielding unit. Thus, the noise such as the flare in the projection image can be prevented.

According to the present embodiment, at least one of the drive section and at least the part of the surface of the side plate is subjected to the antireflection treatment. Thus, it is possible to suppress the stray light, which is generated by the reflected light on the drive section or the surface of the side plate, and to prevent the noise such as the flare in the projection image.

In the present embodiment, the description is made on the example in which the member in which the lens barrel 108, the side plate 109, and the holder 110 are integrated is used. However, the present disclosure is not limited to the above. For example, it may be configured that the lens barrel 108 is separated from the side plate 109 and the holder 110. In such a case, when the lens barrel 108 is fixed to one of the side plate 109 and the holder 110, the lens barrel 108 may be fixed via a vibration-proof member such as vibration-proof rubber or vibration-proof gel. Because the vibration-proof member absorbs vibrations associated with the rotation of the drive section 112, it is possible to prevent the lens group 107, which is accommodated in the lens barrel 108, from being displaced due to the vibrations and to prevent the reduced fluorescence condensing efficiency caused by the displacement of the lens group 107.

The holder 110 in the present embodiment may hold the drive section 112 via a high heat conductive member having higher heat conductivity than the holder 110. More specifically, a heat conductive sheet that is made of a silicone resin, ceramic, or the like is interposed between the holder 110 and the drive section 112, and the drive section 112 is fixed to the holder 110. Alternatively, grease with the high heat conductivity may be used as the high heat conductive member, and the grease with the high heat conductivity may be interposed between the holder 110 and the drive section 112.

The drive section 112 may generate heat by the rotation. Due to the heat generation of the drive section 112, a temperature of the phosphor layer 111b in the phosphor wheel 111 may be increased, and fluorescence luminous efficiency may be reduced. When the heat generated by the drive section 112 is transferred to the holder 110 side by the heat conductive sheet, heat transfer to the phosphor wheel 111 can be suppressed, and the reduced fluorescence luminous efficiency of the phosphor layer 111b, which is caused by the heat generation of the drive section 112, can be suppressed.

Second Embodiment

Next, a description will be made on a light source module according to a second embodiment of the present disclosure. The description of the same components that are already described in the first embodiment may not be made.

When the phosphor layer of the phosphor wheel is irradiated with the excitation light, the portion irradiated with the excitation light in the phosphor layer generates the heat. When the phosphor layer is brought into a high temperature state due to the heat generation, the fluorescence luminous efficiency of the phosphor layer may be reduced. In the present embodiment, the light source module includes a heat dissipating member. The heat is exchanged between the phosphor layer and the heat dissipating member, and the heat dissipating member dissipates the heat. In this way, the phosphor layer can be cooled.

Figure 10:
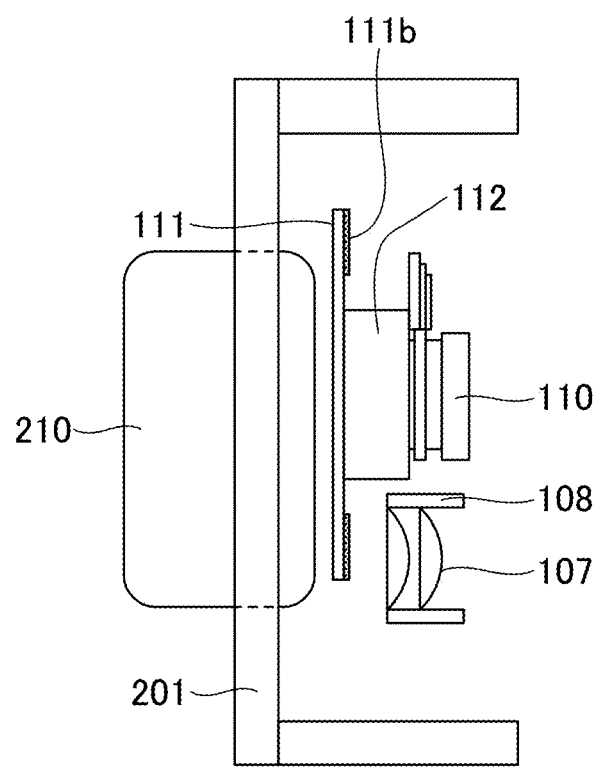
FIG. 10 is a view illustrating an example of a configuration of a light source module according to a second embodiment of the present disclosure.

FIG. 10 is a view illustrating an example of a configuration of the light source module according to the present embodiment. A light source module 200a has a heat sink 210. A through hole is provided on a surface of a casing 201 that opposes the phosphor wheel 111. The heat sink 210 is arranged adjacent to a surface of the phosphor wheel 111 on an opposite side to the surface provided with the phosphor layer 111b through the through hole, and is fixedly attached to the casing 201. The heat sink 210 is an example of the "heat dissipating member" described in the claims.

Because the heat sink 210 is arranged in no contact with the phosphor wheel 111, the rotation of the phosphor wheel 111 is not inhibited by the heat sink 210. As the heat sink 210 is arranged close to the phosphor wheel 111, cooling efficiency of the heat sink 210 is increased. Thus, the heat sink 210 is desirably arranged as close as possible to the phosphor wheel 111.

In the present embodiment, the heat sink is described as the example of the heat dissipating member. However, a heat pipe may be used for heat exchange between the phosphor layer and one of gas and a liquid as a medium.

In addition, in the present embodiment, the description is made on the example in which the heat sink 210 and the casing 201 are configured separately. However, the heat sink 210 and the casing 201 may be integrated. That is, a portion of the casing 201 that is adjacent to the phosphor wheel 111 may be provided with a structure of increasing a surface area of a fin or the like, and such a fin or the like may function as the heat dissipating member. In such a case, the casing 201 is desirably formed of a material having the high heat conductivity such as aluminum.

The other effects are the same as those described in the first embodiment.

The description is made so far on the examples of the embodiments of the present disclosure. However, the present disclosure is not limited to such specific embodiments, and various modifications and changes can be made within the scope of the gist of the present disclosure as set forth in the claims.

For example, in the embodiments, the description is made on the light source module that irradiates the phosphor layer with the excitation light and uses the fluorescence emitted in the opposite direction from the incident direction of the excitation light. However, the present disclosure is not limited to the above.

For example, the present disclosure may be applied to a light source module that irradiates the phosphor layer with the excitation light and uses the fluorescence emitted in the same direction as the incident direction of the excitation light.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. A light source module, comprising:
   a phosphor wheel including a surface upon which a phosphor layer is disposed, the phosphor layer emitting fluorescence when irradiated with light emitted from a light source;
   a drive section that is connected to the phosphor wheel and configured to rotate the phosphor wheel; and
   a lens barrel that accommodates one or more lenses configured to condense the fluorescence, wherein
   each of the lens barrel and the drive section is disposed facing the surface in which the phosphor layer is disposed.

2. The light source module according to claim 1, wherein a plurality of phosphor layers are disposed on the surface of the phosphor wheel, each phosphor layer of the plurality of phosphor layers being configured to emit fluorescence with a different color.

3. The light source module according to claim 2, wherein each phosphor layer is irradiated with the light from the light source, the light source being on a drive-section side of the phosphor wheel.

4. The light source module according to claim 3, wherein the fluorescence emitted from a phosphor layer passes through the one or more lenses in a direction opposite to a direction in which the light, with which the phosphor wheel has been irradiated, passes through the one or more lenses.

5. The light source module according to claim 1, further comprising a heat dissipator disposed at an opposite side of the surface which the phosphor layer is disposed.

6. The light source module according to claim 2, wherein the surface is divided into n sections,
   n being a number of the plurality of phosphor layers, and
   each phosphor layer of the plurality of phosphor layers occupying a different section of the n sections of the surface.

7. The light source module according to claim 6, wherein the plurality of phosphor layers include a yellow phosphor layer emitting yellow fluorescence and a green phosphor layer emitting green fluorescence.

8. The light source module according to claim 1, wherein a reflecting area that reflects incident light is disposed on the surface of the phosphor wheel.

9. An optical device, comprising:
   a light source;
   a phosphor wheel including a surface upon which a phosphor layer is disposed, the phosphor layer emitting fluorescence when irradiated with light emitted from the light source;
   a drive section that is connected to the phosphor wheel and configured to rotate the phosphor wheel; and
   a lens barrel that accommodates one or more lenses configured to condense the fluorescence, wherein
   each of the lens barrel and the drive section is disposed facing the surface in which the phosphor layer is disposed.

10. The optical device according to claim 9, wherein the phosphor wheel and a color wheel are separate from each other.

11. The optical device according to claim 9, further comprising a color wheel through which the light and the fluorescence pass.

12. The optical device according to claim 9, wherein the optical device is configured to emit light to a digital micro-mirror device (DMD) to generate a projection image.

13. The optical device according to claim 9, wherein a plurality of phosphor layers are disposed on the surface of the phosphor wheel, each phosphor layer of the plurality of phosphor layers being configured to emit fluorescence with a different color.

14. The optical device according to claim 13, wherein each phosphor layer is irradiated with the light from the light source, the light source being on a drive-section side of the phosphor wheel.

15. The optical device according to claim 14, wherein the fluorescence emitted from a phosphor layer passes through the one or more lenses in a direction opposite to a direction in which the light, with which the phosphor wheel has been irradiated, passes through the one or more lenses.

16. The optical device according to claim 10, further comprising a heat dissipator disposed at an opposite side of the surface which the phosphor layer is disposed.

17. The light source module according to claim 13, wherein
   the surface is divided into n sections,
   n being a number of the plurality of phosphor layers, and
   each phosphor layer of the plurality of phosphor layers occupying a different section of the n sections of the surface.

18. The light source module according to claim 17, wherein the plurality of phosphor layers include a yellow phosphor layer emitting yellow fluorescence and a green phosphor layer emitting green fluorescence.

19. The light source module according to claim 9, wherein a reflecting area that reflects incident light is disposed on the surface of the phosphor wheel.

* * * * *